US012342036B2

(12) United States Patent
Farrell et al.

(10) Patent No.: US 12,342,036 B2
(45) Date of Patent: *Jun. 24, 2025

(54) CACHING MEDIA IN A MEDIA FLING SYSTEM

(71) Applicant: Comcast Cable Communications, LLC, Philadelphia, PA (US)

(72) Inventors: Corey Farrell, Lansdowne, VA (US); Randall Hounsell, Glen Mills, VA (US); Michael Connelly, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/222,457

(22) Filed: Apr. 5, 2021

(65) Prior Publication Data

US 2021/0367992 A1 Nov. 25, 2021

Related U.S. Application Data

(63) Continuation of application No. 16/831,185, filed on Mar. 26, 2020, now Pat. No. 10,999,342, which is a
(Continued)

(51) Int. Cl.
*H04N 7/18* (2006.01)
*H04L 65/65* (2022.01)
*H04L 65/75* (2022.01)
*H04L 65/756* (2022.01)
*H04L 65/80* (2022.01)
(Continued)

(52) U.S. Cl.
CPC ......... *H04N 21/4363* (2013.01); *H04L 65/65* (2022.05); *H04L 65/75* (2022.05); *H04L 65/756* (2022.05); *H04L 65/80* (2013.01); *H04N 21/4331* (2013.01); *H04N 21/4335* (2013.01); *H04N 21/43615* (2013.01); *H04N 21/4402* (2013.01); *H04N 21/44227* (2013.01); *H04N 21/4516* (2013.01); *H04N 21/632* (2013.01)

(58) Field of Classification Search
CPC ......... H04L 65/75; H04L 65/65; H04L 65/80; H04L 65/756; H04N 21/4331; H04N 21/4335; H04N 21/43615; H04N 21/4363; H04N 21/4402; H04N 21/44227; H04N 21/4516; H04N 21/632
See application file for complete search history.

(56) References Cited

U.S. PATENT DOCUMENTS 5,485,279 A * 1/1996 Yonemitsu ............. H04N 19/59
386/335
6,230,200 B1 5/2001 Forecast et al.
(Continued)

*Primary Examiner* — Annan Q Shang
(74) *Attorney, Agent, or Firm* — Banner & Witcoff, Ltd.

(57) ABSTRACT

Aspects of the disclosure relate to a content (e.g., media) transfer or fling platform system and method. In a media fling platform system, media items may be cached at a rendering device prior to any selection of media items to fling. The determination of which media to cache may be based on a variety of factors including a user fling history, a currently viewed media item, and a navigation point in the media files. A fling request may take priority over caching, and the fling request may interrupt any caching processes.

20 Claims, 6 Drawing Sheets

Related U.S. Application Data continuation of application No. 15/906,672, filed on Feb. 27, 2018, now Pat. No. 10,645,135, which is a continuation of application No. 14/461,213, filed on Aug. 15, 2014, now Pat. No. 9,948,690.

(60) Provisional application No. 61/866,390, filed on Aug. 15, 2013.

(51) Int. Cl.
    *H04N 21/433* (2011.01)
    *H04N 21/4335* (2011.01)
    *H04N 21/436* (2011.01)
    *H04N 21/4363* (2011.01)
    *H04N 21/4402* (2011.01)
    *H04N 21/442* (2011.01)
    *H04N 21/45* (2011.01)
    *H04N 21/63* (2011.01)

(56) References Cited

U.S. PATENT DOCUMENTS

| | | | |
|---|---|---|---|
| 6,330,068 B1 * | 12/2001 | Matsuyama | G06F 3/1288 358/1.14 |
| 6,931,534 B1 * | 8/2005 | Jandel | H04N 1/32776 713/180 |
| 7,117,241 B2 | 10/2006 | Bloch et al. | |
| 7,301,944 B1 * | 11/2007 | Redmond | H04L 65/1101 725/93 |
| 7,574,451 B2 | 8/2009 | Burges et al. | |
| 7,664,697 B2 | 2/2010 | Takayama | |
| 7,840,620 B2 | 11/2010 | Vignoli et al. | |
| 8,028,323 B2 | 9/2011 | Weel | |
| 8,060,638 B1 | 11/2011 | Kapoor | |
| 8,169,916 B1 * | 5/2012 | Pai | H04N 21/2181 709/200 |
| 8,224,964 B1 | 7/2012 | Fredrickson et al. | |
| 8,423,071 B1 | 4/2013 | Sun | |
| 8,544,046 B2 | 9/2013 | Gran et al. | |
| 8,577,411 B2 | 11/2013 | Adachi et al. | |
| 8,610,603 B2 | 12/2013 | Lai et al. | |
| 8,818,277 B2 | 8/2014 | Chen | |
| 8,935,279 B2 | 1/2015 | Skeen et al. | |
| 8,977,763 B1 * | 3/2015 | Brown | H04L 67/568 709/231 |
| 9,179,199 B2 | 11/2015 | Alsina et al. | |
| 9,436,929 B2 | 9/2016 | Oliver et al. | |
| 9,462,032 B2 * | 10/2016 | Lieber | H04L 65/762 |
| 9,955,225 B1 | 4/2018 | Wood | |
| 2001/0040886 A1 * | 11/2001 | Jimenez | H04L 69/16 707/E17.107 |
| 2002/0087887 A1 | 7/2002 | Busam et al. | |
| 2002/0099766 A1 | 7/2002 | Tuli | |
| 2002/0107944 A1 | 8/2002 | Bai et al. | |
| 2002/0194121 A1 | 12/2002 | Takayama | |
| 2002/0194483 A1 * | 12/2002 | Wenocur | H04L 65/80 713/185 |
| 2004/0139318 A1 | 7/2004 | Fiala et al. | |
| 2004/0249723 A1 | 12/2004 | Mayer | |
| 2005/0188406 A1 | 8/2005 | Gielow et al. | |
| 2006/0080703 A1 | 4/2006 | Compton | |
| 2007/0107026 A1 | 5/2007 | Sherer et al. | |
| 2007/0136322 A1 | 6/2007 | Cormack et al. | |
| 2007/0174471 A1 | 7/2007 | Van Rossum | |
| 2007/0226338 A1 | 9/2007 | Burch et al. | |
| 2008/0072261 A1 | 3/2008 | Ralston et al. | |
| 2008/0091717 A1 | 4/2008 | Garbow et al. | |
| 2008/0098101 A1 | 4/2008 | Black et al. | |
| 2008/0177994 A1 | 7/2008 | Mayer | |
| 2008/0220767 A1 | 9/2008 | Aretz et al. | |
| 2008/0250458 A1 | 10/2008 | Roman | |
| 2008/0282295 A1 | 11/2008 | Gabriel et al. | |
| 2009/0165062 A1 * | 6/2009 | Harris | H04N 21/44222 725/87 |
| 2010/0023578 A1 | 1/2010 | Brant et al. | |
| 2010/0057872 A1 | 3/2010 | Koons et al. | |
| 2010/0146580 A1 | 6/2010 | Chen et al. | |
| 2010/0169502 A1 | 7/2010 | Knowlson et al. | |
| 2010/0169514 A1 | 7/2010 | Noguchi et al. | |
| 2010/0169910 A1 | 7/2010 | Collins et al. | |
| 2010/0198982 A1 * | 8/2010 | Fernandez | H04N 21/6125 709/231 |
| 2010/0223407 A1 | 9/2010 | Dong et al. | |
| 2010/0248786 A1 | 9/2010 | Charriere | |
| 2010/0332754 A1 | 12/2010 | Lai et al. | |
| 2011/0041065 A1 | 2/2011 | Bangma et al. | |
| 2011/0106969 A1 | 5/2011 | Choudhury et al. | |
| 2011/0148932 A1 | 6/2011 | Niemi et al. | |
| 2011/0161815 A1 | 6/2011 | Iwahara | |
| 2011/0307548 A1 | 12/2011 | Fisk et al. | |
| 2012/0089674 A1 | 4/2012 | Staykoff | |
| 2012/0089675 A1 | 4/2012 | Thrower, III et al. | |
| 2012/0136929 A1 | 5/2012 | Li et al. | |
| 2012/0151006 A1 | 6/2012 | McInerney et al. | |
| 2012/0232681 A1 | 9/2012 | Mundy et al. | |
| 2012/0311648 A1 | 12/2012 | Swildens et al. | |
| 2013/0013740 A1 | 1/2013 | Liu et al. | |
| 2013/0097516 A1 | 4/2013 | Hong et al. | |
| 2013/0117385 A1 | 5/2013 | Pasko et al. | |
| 2013/0238777 A1 | 9/2013 | Raleigh et al. | |
| 2013/0318206 A1 | 11/2013 | Hsiao | |
| 2014/0026201 A1 | 1/2014 | Srinivasan et al. | |
| 2014/0108929 A1 | 4/2014 | Garmark et al. | |
| 2014/0115114 A1 * | 4/2014 | Garmark | H04N 21/4438 709/219 |
| 2014/0156781 A1 | 6/2014 | Childs et al. | |
| 2014/0282295 A1 | 9/2014 | Huang et al. | |
| 2015/0032851 A1 * | 1/2015 | Lieber | H04L 65/762 709/219 |
| 2015/0067150 A1 | 3/2015 | Heredia et al. | |
| 2015/0301981 A1 | 10/2015 | Huang et al. | |
| 2015/0341812 A1 | 11/2015 | Dion et al. | |
| 2015/0373140 A1 | 12/2015 | Haenel et al. | |
| 2015/0382054 A1 | 12/2015 | Rao et al. | |
| 2016/0261657 A1 * | 9/2016 | Bruhn | H04L 67/59 |

\* cited by examiner

CACHING MEDIA IN A MEDIA FLING SYSTEM

CROSS-REFERENCE TO RELATED APPLICATIONS

This application is a continuation of U.S. patent application Ser. No. 16/831,185, filed Mar. 26, 2020, which is a continuation of U.S. patent application Ser. No. 15/906,672, filed Feb. 27, 2018, now U.S. Pat. No. 10,645,135, which is a continuation of U.S. patent application Ser. No. 14/461,213, filed on Aug. 15, 2014, now U.S. Pat. No. 9,948,690, which claims priority to U.S. Provisional Application No. 61/866,390, entitled "MEDIA FLING PLATFORM" and filed on Aug. 15, 2013, the contents of which are hereby incorporated by reference.

BACKGROUND

Current solutions in the market allow personal media (videos, photos, and music) to be sent from a mobile device to a media renderer connected to a consumer television. This "fling" capability is currently not consistent and riddled with consumer use problems and technical limitations. Some issues include: a) lack of quality and reliability due to network limitations and network configuration, b) limitations of various file types, codecs and other environment specific considerations; c) lack of a ubiquitous environment across DLNA, Airplay (Apple) and other protocols; d) lack of end to end monitoring and QoS (Quality of Service) since the service needs to be managed across source device and target device, and e) lack of consistent user experience across apps and devices.

None of these solutions have garnered mass adoption. The Digital Living Network Alliance (DLNA) is perhaps the most used system today. DLNA guidelines specify ways of achieving interoperability but have the disadvantage of excluding most free audio formats and most common video formats. DLNA uses Universal Plug and Play (UPnP) for media, defines the type of device (e.g., "server," "renderer," and "controller") and specifies techniques for accessing media over a network. DLNA has many restrictions over the types of media file formats, encodings and resolutions, and these limitations have limited wide spread adoption of DLNA.

In DLNA solutions today, the time between when a user clicks on her mobile device and when the content appears or begins playing on the TV is usually at least four seconds. This amount of latency presents significant issues especially when users "swipe" through a number of photos quickly. Although some device manufacturers (e.g., HP) have attempted to use techniques such as Twonky Media Server and PacketVideo to alieviate some of the deficiencies of DLNA, these systems do not currently work effectively. Even in closed environments such as Apple's AirPlay, the latency can be 2 seconds or more. In DLNA solutions today, users frequently experience buffering and freezing when they send video to the TV. The video quality is far superior when users simply play on their mobile device versus compared to when they output over Wi-Fi to their TV. In order to establish the required connection between a mobile and TV device to enable flinging today, users need to go through a number of complicated steps. DLNA solutions often involve 1) connecting the TV to the WiFi network and entering WPA credentials, 2) using a mobile phone to manually scan for other DLNA devices on their home network, and 3) configuring the TV to approve mobile devices that can fling to that TV. Users often balk at one of these steps, and thus remain as a practical matter generally unable to render mobile device content on other screens such as TV screens. Additionally, there are many competing standards including AirPlay, DLNA, and Miracast and even within some of these standards there are conflicting protocols. The above mentioned problems can result in issues for consumers including 1) the inability to detect rendering devices and 2) unsuccessful flinging experiences, where the rendering device can not render the content, and 3) poor quality experiences that include frozen video and substantial latency.

SUMMARY

The following summary is for illustrative purposes only, and is not intended to limit or constrain the detailed description.

Some features herein relate to a content (e.g., media) transfer or fling platform or system and method. In the content fling platform or system, content may be cached at a rendering device before selection of any content for flinging occurs to improve the user experience. The determination of which content to cache may be based at least on a variety of factors including a user fling history, a currently viewed media item, and a navigation point in the media files of the electronic device (e.g., a location of a currently viewed or previewed media file in a storage hierarchy). A fling request may take priority over caching, and the fling request may interrupt any ongoing or scheduled caching processes.

In some aspects, the electronic device may begin caching content items as soon as the electronic device associates with a rendering device. The rendering device may be located using wireless signals, and the electronic device may automatically select the geographically most proximate device.

In some aspects, the system may include a preview mode which enables a user to view a media item on the electronic device before deciding whether to fling the media item. The media items to cache may be based on media items that the user previews. The media items in the preview mode may be arranged in a particular linear order (e.g., chronologically, alphabetically, most recently flung or transferred, etc.), and the media items may be cached at the rendering device according to the linear order of the media items.

The summary provides some examples and is not an exhaustive listing of the novel features described herein, and are not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

Figure 1:
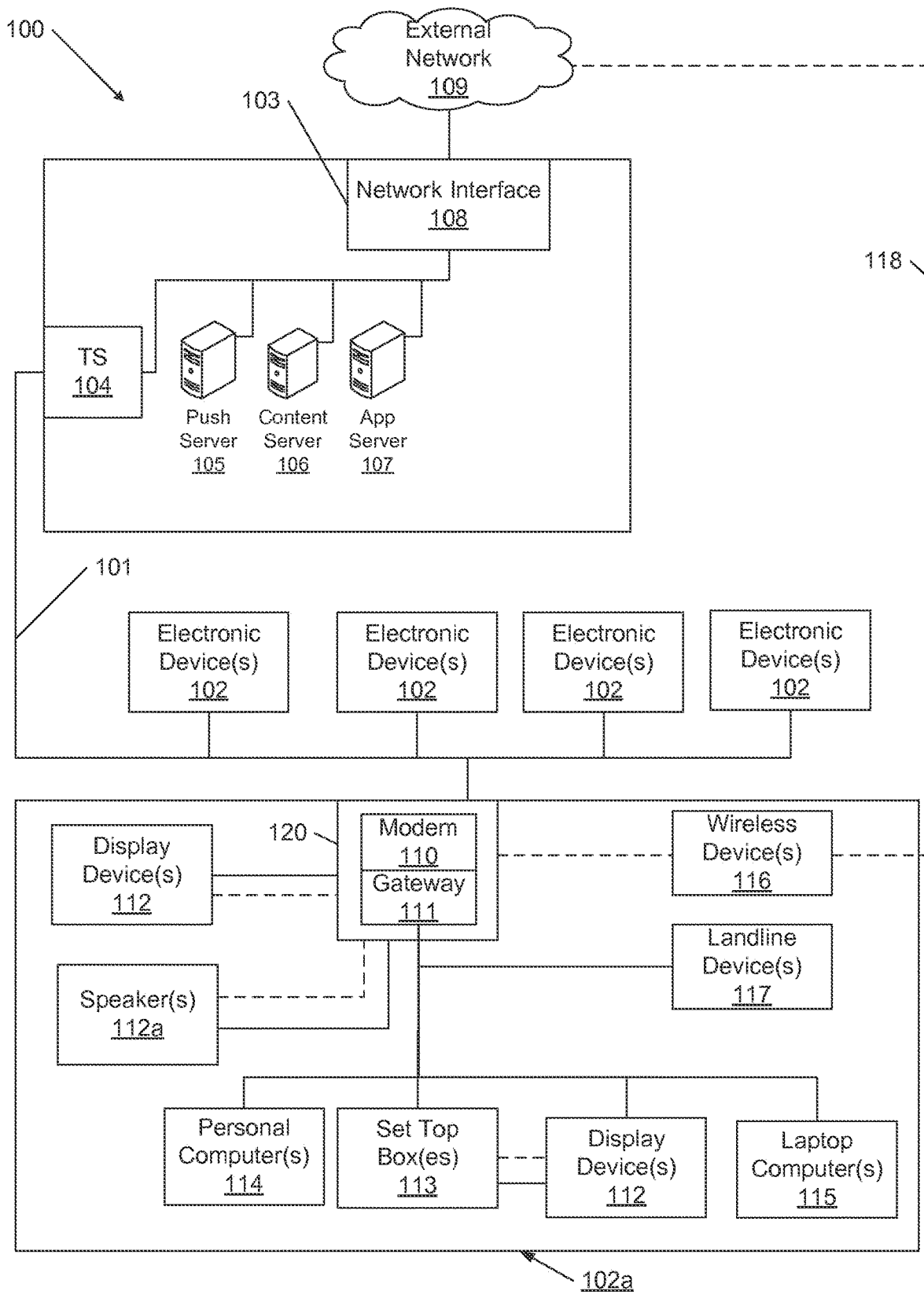
FIG. 1 illustrates an example communication network on which various features described herein may be used.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Aspects described herein may relate to a media fling platform or system. Various aspects of the media fling system are also described in related applications U.S. patent application Ser. No. 14/461,207 filed on Aug. 15, 2014, and entitled "MEDIA FLING SYSTEM," and U.S. patent application Ser. No. 14/461,225 filed on Aug. 15, 2014, and entitled "MULTIPLE FLINGING DEVICES IN A MEDIA FLING SYSTEM," both of which are hereby incorporated by reference herein in their entirety. The media fling system may support flinging of media content to output device(s). Media may be flung under control of a computing device to an output device(s). The media may be flung from media stored on the computing device or media stored in other devices which may be accessed via a network. The computing device may facilitate the transmission of the media to the output device(s). For example, the computing device may control transmission of the media content to a rendering device in communication with and/or connected to the output device(s).

In some aspects, the media fling platform may provide users with an effortless experience to enjoy their own content through: 1) Accessing content stored in various places on their home network or in the cloud, 2) Using one or more mobile devices to control their content on various connected devices across mobile and fixed networks, 3) Optimizing the delivery of the content between the source and the renderer, and 4) Enabling content access, control, and rendering across mobile and fixed networks. The platform may be configured to enable users to navigate and control their own content using their mobile devices while viewing and consuming the content on their TV.

A user's "own" content may, for example, include 1) personal media such as photos, video, and music 2) professional and semi-professional content such as movies. The content may be stored in the mobile devices themselves, personal, public, and/or semi-private clouds, home PC, network attached storage (NAS), Internet Video Services, and/or third party clouds. Embodiments of the platform may include one or more DLNA server(s), content controller(s), Miracast and/or multicast server(s), audio server(s) including queuing controller, zone controllers and synchronization controllers, client application logging such as determining user analytics, rendering device controls such as operator selectors, device resets, factory default and configurable settings, business logic, DMR filters and compatible renderers, transcoders, server orchestrator (mediates contention between streaming protocol servers), cloud tune for assets located in cloud, application white-list check for administrative functions (e.g. operator selector, device reset, factory default), re-encapsulation media assets to support incompatible renderers, transcoding of media assets to support incompatible renderers, and enforcement of DTCP content protection for premium paywall content. The platform rendering device may include one or more DLNA renderer(s), player(s) including queue(s), Miracast and/or multicast renderer(s), audio renderer(s) including queue, zone controller and synchronization manager, client analytics, rendering device control(s), and business logic. Content may be accessed and rendering devices may be recognized across LAN and WAN networks and across mobile and fixed networks. The platform may also include one or more tuned video pipeline(s), one or more buffering platform(s) for handling multiple video media types, one or more server orchestrator(s) for mediating contention between streaming protocol servers, one or more Wi-Fi optimizations specifically tuned to allow consistent QoS from any platform capable mobile device and application.

The fling platform in many embodiments may be portable across mobile operating systems as well as various types of rendering devices.

With mobile phones increasingly fulfilling multiple functions for customers including as cameras and video recorders, the Fling platform may be configured to seamlessly take those events and allow users to move it from the small screen in their hands to another screen such as the television without the user having to be aware of whether they had an iPhone/iPad, Microsoft tablet, an Android device, or some other mobile and/or handheld/hand-holdable device.

FIG. 1 illustrates an example communication network 100 on which many of the various features described herein may be implemented. Network 100 may be any type of information distribution network, such as a fiber, hybrid/fiber coax, internet, Internet, intranet, satellite, telephone, cellular, wired, and/or wireless, etc. Examples may be a wireless phone network, an optical fiber telecommunication network, a coaxial cable distribution network, and/or a hybrid fiber/coax distribution network. Such networks 100 may be configured to use a series of interconnected communication links 101 (e.g., coaxial cables, optical fibers, wireless, etc.) to connect multiple electronic devices 102 (e.g., computers, laptop, set-top boxes, tablets, smart phones, televisions, terminals, networks, etc. remotely located at, for example, businesses, homes, consumer dwellings or other locations remote from the central communication system) to central communication system 103 such as an internet, Internet, local office, server, internal and/or external network and/or headend. The central communication system 103 may transmit downstream information signals onto one or more links 101, and the electronic devices 102 may have one or more communication devices to receive and process various signals from the links 101.

There may be one link 101 originating from the central communication system 103, and it may be split and/or repeated a number of times to distribute the signal to various electronic devices 102 in the vicinity (which may be many miles) of the central communication system 103. The links 101 may include components not illustrated, such as splitters, repeaters, filters, amplifiers, etc. to help convey the signal clearly. Portions of the links 101 may also be implemented with fiber-optic cable, while other portions may be implemented with coaxial cable, other lines, and/or wireless communication paths.

The central communication system 103 may include an interface, such as a termination system (TS) 104. More specifically, the interface 104 may be a cable modem termination system (CMTS), which may be a computing device configured to manage communications between devices on the network of links 101 and backend devices such as servers 105-107. The interface 104 may be as specified in a standard, such as any of the standards used on the Internet (e.g., IP), any connection or connectionless protocol, the Data Over Cable Service Interface Specification (DOCSIS) standard, published by Cable Television Laboratories, Inc. (a.k.a. CableLabs), or it may be a similar or modified device instead. In other embodiments, the interface 104 may be a wireless receiver. The interface 104 may be configured to place data on one or more downstream frequencies to be received by modems located with the various electronic devices 102, and to receive upstream communications from those modems on one or more upstream frequencies.

The central communication system 103 may also include one or more network interfaces 108, which can permit the central communication system 103 to communicate with various other external networks 109. These networks 109 may include, for example, networks of Internet devices/servers/locations, internet devices, Intranet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones. Further, central communication system 103 may itself form a part of a larger communication network. In various exemplary embodiments, those networks may be a private network, the internet, and/or the Internet.

As noted above, the central communication system 103 may include a variety of servers 105-107 that may be configured to perform various functions. The servers 105-107 may themselves comprise other servers and/or load balancing networks. For example, the central communication system 103 may include a push notification server 105. The push notification server 105 may generate push notifications to deliver data and/or commands to the various electronic devices 102 in the network (or more specifically, to the devices associated with the electronic devices 102 that are configured to detect such notifications). The central communication system 103 may also include a content server 106. The content server 106 may be one or more computing devices that are configured to provide content to electronic devices. This content may be, for example, video on demand movies, television programs, songs, text listings, etc. The content server 106 may include software to validate user identities and entitlements, to locate and retrieve requested content, to encrypt the content, and/or to initiate delivery (e.g., streaming) of content to the requesting user(s) and/or device(s).

The central communication system 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the electronic devices 102. Although shown separately, one of ordinary skill in the art will appreciate that the push server 105, content server 106, and application server 107 may be combined. Further, in FIG. 1, the push server 105, content server 106, and application server 107 are shown generally, and it will be understood that they may each contain memory storing computer executable instructions to cause a processor to perform steps described herein and/or memory for storing data and function in accordance with any of the algorithms described herein.

An example of the electronic devices 102 is shown in more detail as a collection of electronic devices 102a (e.g., a cell phone, tablet, set-top box, television, and/or laptop) and may optionally include an interface 120. The interface 120 can include any communication circuitry needed to allow a device to communicate on one or more links 101 with other devices in the network. For example, the interface 120 may include a modem 110, which may include transmitters and receivers used to communicate on one or more of the links 101 and with the central communication system 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. For example, some of these modems may be wired, some may be wireless such as 802.11 and/or 4G, and others may be suitable to other technologies such as WiMax and/or fiber.

Further, the interface 120 may include a gateway interface device 111. The modem 110 may be connected to, or be a part of, the gateway interface device 111. The gateway interface device 111 may be a computing device that communicates with the modem(s) 110 to allow one or more of the electronic devices 102a, to communicate with the central communication system 103 and other devices beyond the central communication system 103. The gateway 111 may be a set-top box (STB), digital video recorder (DVR), computer server, or any other desired computing device such as a phone, tablet, and/or laptop. The gateway 111 may also include (not shown) local network interfaces to provide communication signals to requesting entities/devices associated with the electronic devices 102a, such as display devices 112 (e.g., televisions, tablets), additional STBs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others. The wireless devices 116 may connect to the links 101 via the interface 120 or via a wireless communication link 118 with the external network 109. The wireless communication link 118 may be a cellular connection or a connection to a wireless wide area network (WWAN).

Figure 2:
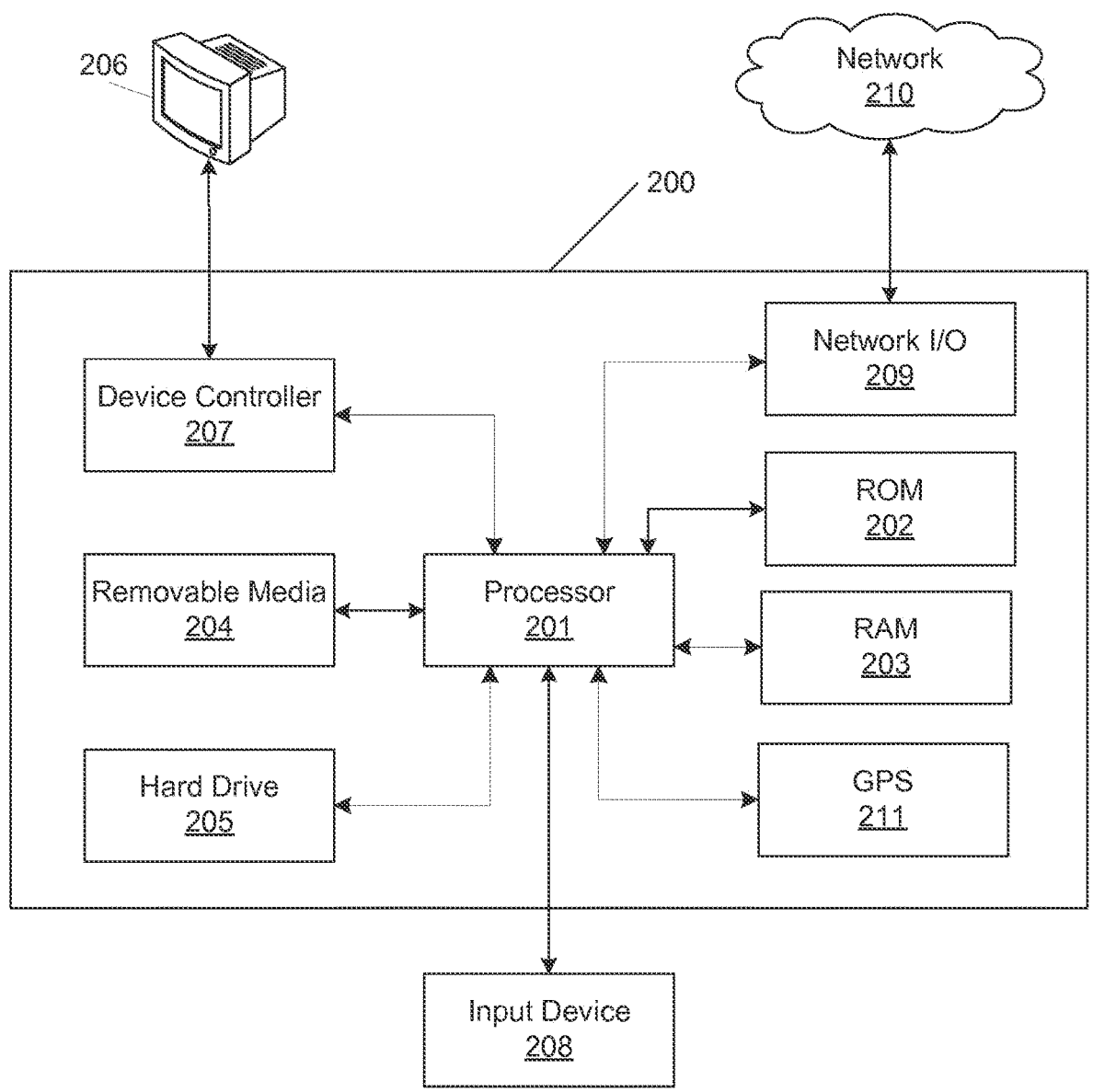
FIG. 2 illustrates an example computing device that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The processor may include one or more decoders for video compression and/or decompression. In some devices such as cellular telephones and/or tablets, the processor 201 may include a single decoder for video. The instructions for the processor 201 may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205.

The computing device 200 may include one or more output devices, such as a display 206 (e.g., an external television), and may include one or more output device controllers 207, such as a video processor (e.g., a macroblock video decoder such as AVC/H.264). There may also be one or more user input devices 208, such as a remote control, keyboard, mouse, touch screen, smart phone, tablet, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem, fiber modem, and/or wireless modem), and the external network 210 may include the communication links 101 discussed above, the external network 109, an in-home network, a provider's wireless, coaxial, fiber, hybrid fiber/coaxial distribution system (e.g., a DOCSIS network), and/or any other desired network. Additionally, the device may include a location-detecting device, such as a global positioning system (GPS) microprocessor 211, which can be configured to receive and process global positioning signals and determine, with possible assistance from an external server and antenna, a geographic position of the device. In some embodiments, the computing device 200 may include a Digital Living Network Alliance (DLNA) compliant protocol renderer, AirPlay (a registered trademark of Apple) compliant renderer, or other rendering device for receiving flung content and rendering it onto one of the output devices such as displays and/or speakers.

The examples in FIG. 1 and FIG. 2 may be modified in various ways. For example, modifications may be made to add, remove, combine, divide, etc. components of the computing device 200 and/or communication network 100 as desired. Additionally, the components illustrated may be implemented using basic computing devices and components, and the same components (e.g., processor 201, ROM storage 202, display 206, etc.) may be used to implement any of the other computing devices and components described herein. For example, the various components herein such as those in FIG. 1 may be implemented using computing devices having components such as a processor executing computer-executable instructions stored on a computer readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
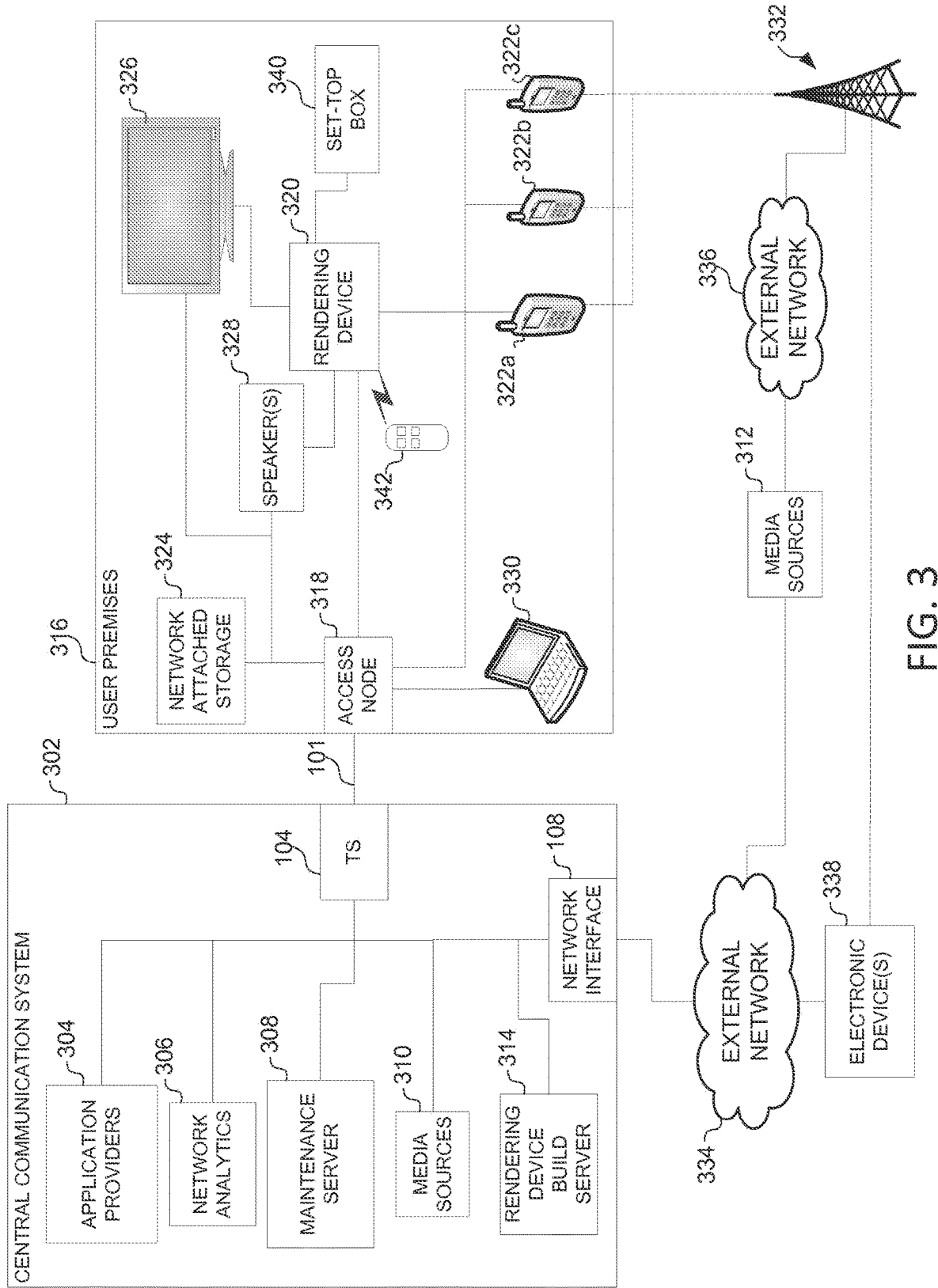
FIG. 3 illustrates an example media fling system according to various aspects of the disclosure.

FIG. 3 illustrates an example of a content (e.g., media) fling platform or system 300 in accordance with some aspects of the disclosure. While the media fling platform 300 may be variously configured (including configurations shown in FIGS. 1-2), an alternate configuration is shown in FIG. 3. In one embodiment, the media fling platform 300 may include one or more of the components as shown. The media fling system 300 may include a central communication system 302 and a user premises 316.

The central communication system 302 may be configured similar to the central communication system 103. The central communication system 302 may further include servers or computing devices 304, 306, 308, 310, which can perform various functions. The servers or computing devices included in the central communication system 302 may communicate with electronic devices at a user premises 316 via communication links such as communication links 101. The central communication system 302 may communicate with devices at the user premises 316 via the termination system (TS) 104 of the central communication system and access node 318 at the user premises 316. The central communication system 302 may communicate with external network(s) 334 via network interface 108. The central communication system 302 may include application providers 304, network analytics 306, maintenance server 308, and media sources 310.

The application providers 304 may be a server(s) hosting an application store or providing applications for flinging and/or configuring the media fling platform 300. The application store may serve as the source of flung media content.

The network analytics server 306 may provide data analysis of the various networks within and around the user premises 316 and between the user premises 316 and various external sources such as the central communication system 302 and/or network attached resources. The network analytics server 306 may be configured to analyze various types of traffic on the different networks, devices, and system. The network analytics server 306 may receive data relating to all fling platform functions such as flung media, transcoding, rendering, encoding, and resolution to the most efficient parameters to enhance the user experience based on measured performance values such as buffering, paused video, network congestion, competing flung media, and output device capabilities and availability. The network analytics server 306 can also be used to analyze the overall "health" of the platform, customer usage statistics and trending and longer term business intelligence.

The maintenance server 308 may provide a mechanism to collect, index and harness data (e.g., machine data, media data, media flows, program flows, game flows and other data) generated by flung media and applications, as well as associated networks, servers and devices including physical devices/networks, virtual devices/networks and cloud based devices/networks. The maintenance server 308 allows the media fling platform to troubleshoot application problems in real-time, investigate security warnings and flings in real-time in order to avoid service degradation or outages associated with the media fling platform to deliver a more robust and reliable user experience. The maintenance server 308 may be configured to receive various event data including crash logs, latency parameters, and run network analytics to determine and correct issues that may impact user experience before they impact the user media fling experience. Such issues might include microwave interference with a wireless network frequency range and switching the preferred fling network channel to certain display and/or rendering devices responsive to environmental condition changes. The maintenance server also allows for the ability to merge disparate data across sources in order to drive better operational analytics across the fling platform. One example of this is the ability to correlate data from the source fling application (on the mobile device) to the target fling device (rendering device connected to an output display device (e.g., television)) and determine start and end fling times. This data can be used to monitor and manage service level agreements and other operational monitoring required to ensure a good quality of service.

Media sources 310 may include a variety server or computing devices that store or otherwise provide access to media or media content including but not limited to pictures, videos, games, comments, slides, music, postings, web content, etc. The media sources 310 may include network sources and/or applications such as social network applications including Facebook, Twitter, Instagram, or other proprietary applications such as those hosted by media or network providers including Comcast, Verizon, Time Warner, Disney, NBC, AT&T, Netflix, Hulu, etc. Additionally, the application store 304 may be the source of flung media content, for example, purchased media content (e.g., movies, tv shows). Further, content need not reside within a mobile application or in a cloud network source. Media content may also be stored on a home network device such as a computer 330 or network attached storage (NAS) 324 which may be used as a source device of flung media. The media sources 310 may be included in the central communication system 302 or be accessed through an external network such as external networks 109, 334, 336.

Turning to the devices at the user premises 316, one or more access interfaces or nodes 318 may be provided at the user premises 316. The interface 318 may be implemented similar to interface 120 and may include a gateway interface device 111 and modem 110 to communicate with the central communication system 302. Various electronic devices 320, 322, 324, 328, 330, may be connected to the access interface 318 to communicate with the central communication system 302 and with other devices connected to the access interface 318. The electronic devices 320, 322, 324, 328, 330 connected to the access interface 318 may form a network at the user premises 316. The connections between the electronic devices 320, 322, 324, 328, 330 may be wired and/or wireless connections. Additionally, one or more electronic devices 322a-c may be present and flinging at the user premises 316.

Some of the devices at the user premises 316 may be able to connect to more than one type of network and fling content over more than one network. For example, electronic device 322 may be an electronic device with cellular network connection capabilities such as a mobile phone, laptop, or tablet device which can connect with access node 318 and an external cellular network 332, 336. Via the external network 332, 336, the electronic device 322 can also access various media sources 310.

As will be described herein, a user may use the electronic device 322 and associated applications to fling content to one or more output devices (e.g., television 326, speaker(s) 328, computer 330) via a rendering device 320. The flung content may include applications, photos, videos, games, music, files, and/or other data stored remotely from the electronic device 322, in the electronic device 322, or locally (e.g., NAS 324, computer 330). These mobile devices and associated applications 314 may initiate and control the media fling platform in a similar manner to how a remote control device today controls a television. However, the mobile device 314 and its associated applications creates a unique and customized user experience that enables the user to take his experience with him or her wherever they happen to go such as to a friend's house, family member's house, sports bar, neighbor's house, summer home, hotel, boat, car, plane, train, and/or different rooms of their own house. The user's media follows the user's mobile device and can be flung to any associated output device such as display and/or audio devices (e.g., display devices 112 and/or separate speakers/headphones 112a). Thus, the user may "carry" his or her own content with them to whatever location they happen to travel. The content may be located on the mobile devices 322, 330, and/or may be located at servers in the home 324, and/or in the cloud 310, 312.

Computing device or rendering device 320 (e.g., a set-top box, IP set-top box, gateway or other suitable device) may transcode, fling, and/or transport flung media. Rendering device 320 may be a standalone unit such as an associated AirPlay or BuddyBox type device, a rendering device unit, a gateway, and/or a set-top box which functions to render media to various output devices (speakers, displays, lights) under user control such as under control of mobile devices 322, 330, and/or fixed/mobile devices such as set-top box 340 and/or a remote control 342. While shown as a stand-alone device, the rendering device 320 may also be included in the access node 318. The rendering device 320 may be configured with various media interfaces such as DLNA, Airplay, wireless, and/or wired network interfaces to enable media to be flung to any suitable output device including displays, speakers, and/or lights. Each electronic device at the user premises 316 may be connected to one or both the access node 318 and the rendering device 320. When connected to the same network, each device can act in a coordinated manner.

The NAS 324 may be associated with the electronic device 322 and/or computing device(s) 330 and/or other various computing devices such as set-top boxes. Various devices connected to the same network as the NAS 324 may use the NAS 324.

Various servers such as server 310, 312, 105, 106, 107 and/or other media sources such as packet video source may be utilized to fling media under, for example, control by the various mobile/wireless devices. Further, the rendering devices may be under the control of a remote rendering device build server 314 which can dynamically reconfigure the rendering device to be more efficient dependent on the types of media being flung and/or the devices associated with the rendering device. Servers such as the maintenance server 308 can also act as remote management servers that can do introspective analysis of a user's device. This includes the ability to reboot, re-flash software, and take over control for remote management needed for problem resolution. Additionally, these cloud components may be configured to 1) detecting rendering devices across LANs/WANs, 2) accessing content across LANs/WANs, 3) streaming content between LANs/WANs, and/or render the same content cross LANs/WANs and/or across disparate devices connected across LANs/WANs.

Figure 4:
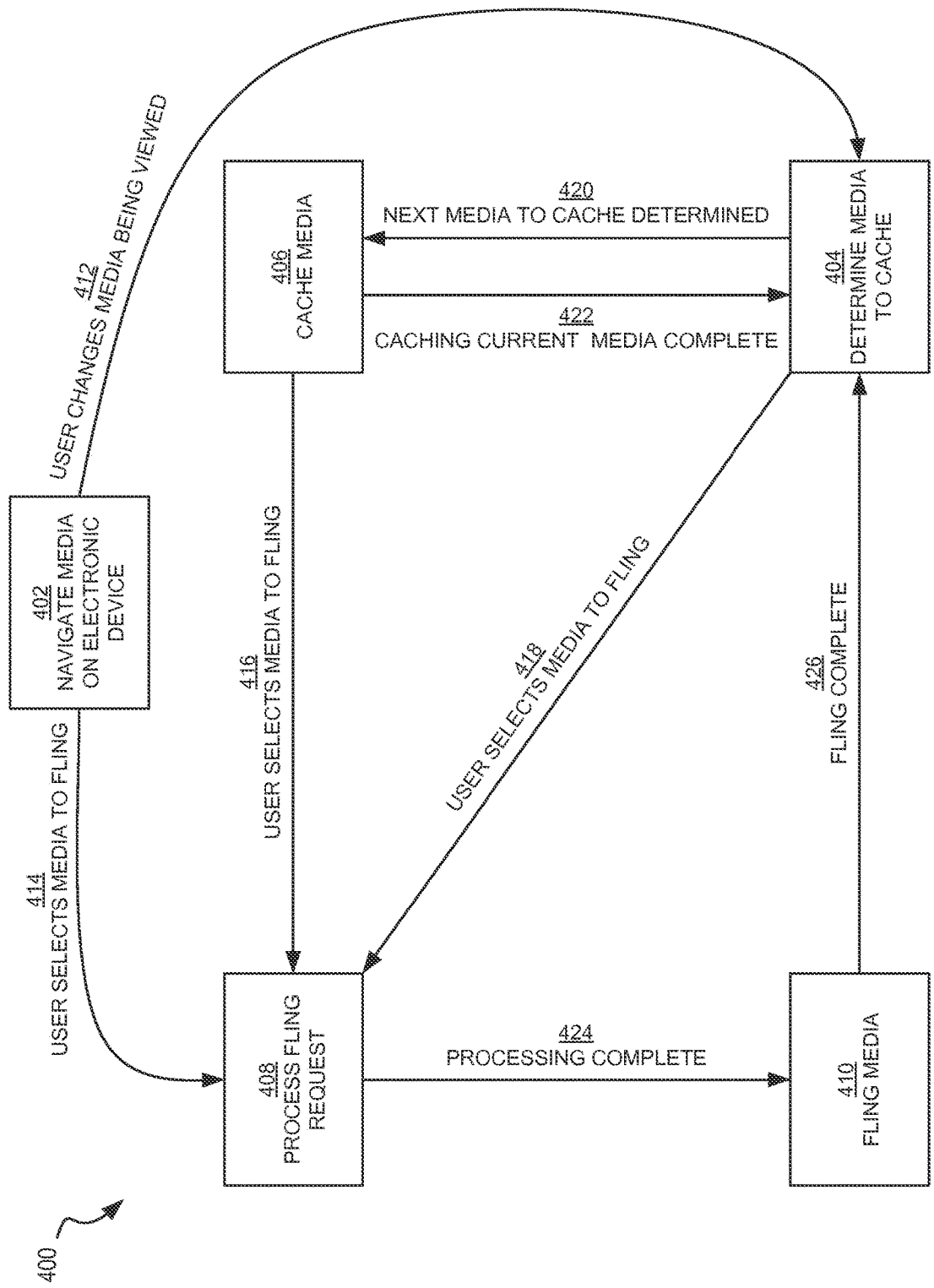
FIG. 4 illustrates an example state diagram of an electronic device according to various aspects of the disclosure.

FIG. 4 illustrates an example state diagram 400 of a system or device for caching fling media. The electronic or mobile device 322, for example, may be in various states 402, 404, 406, 408, 410. At state 402, the user may be navigating through media on the electronic or mobile device 322 as the user changes media being viewed 412 the mobile device 322 may be updating the media items to cache at state 404. Once the user selects media to transfer, send, or fling 414, 416, 418 to a rendering device, the mobile device 322 may process the fling request at state 408. At state 404, the mobile device 322 may be determining the media to cache and proceeding to state 406 when the mobile device determines the next media to cache 420. At state 406, the mobile device may be processing and transmitting media to the cache at the rendering device 320. Once the caching of the current media is complete, the mobile device may return to state 404 to determine the next media item to cache. At state 408, the mobile device 322 may be processing the fling request, and at state 410, the mobile device may be flinging the requested media. After the fling is complete 426, the mobile device may return to caching media at state 404. Thus, the mobile device 322 may transition between the different states based on different triggers and/or inputs.

The states shown in FIG. 4 will now be described in more detail. Starting with state 402, the user may be browsing through or previewing various media files on the mobile device and/or navigating through folders to reach a desired media file. For example, the media in a folder or application may be arranged to be previewed in a linear order and the user may move forward and backward to view each piece of media. As shown in FIG. 4, the mobile device 322 may transition from state 402 to state 404 or state 408 based on the user's actions. If the user selects media to send, transfer, or fling, the mobile device 322 may begin transforming (e.g., processing) the media for flinging in state 408. If the user navigates forward or backward to preview the next media item, the mobile device 322 may transition to state 404 to determine the media to cache based on the media item that the user is currently previewing and various other factors which will be described in more detail herein. According to another aspect, the mobile device 322 may have a mode where the media is being flung as the user is viewing or previewing media on the mobile device 322. In other words, the media being currently flung matches the media being currently viewed or previewed on the mobile device.

At state 404, the system may be continuously determining media to cache, transforming (e.g., processing) media for caching, and caching media during any idle periods. Idle periods may occur while the user is previewing media and/or when flinging of a media item is completed and before the user selects another piece of media for flinging. Idle periods may be present, for example, in between media being shown in a slideshow format and when the user is browsing through media. For example, based on the rate at which the user is browsing or flipping through media content (e.g., pictures), the fling application may estimate the duration of the idle period or the amount of time before the next media item is accessed. The estimated idle time may be, for example, an average time between each fling request for the current session or may be a rolling window of the previous x number (e.g., 2, 3, 4, etc.) of fling requests.

As another example, the media may be periodically flung in the form of a slideshow with a timed duration to display each media item. The system may be passed the slideshow information from the slideshow application and/or the system may determine the time period between each slide. In the event the user is creating the slideshow, the media used in the slideshow may be cached as the user creates the slideshow. The fling application and/or cache may make real-time decisions about resolution, transcoding, and desired network based on the idle period between media.

In some aspects, the mobile device 322 may have proximity detection and may be able to pre-cache to the geographically most proximate device. Alternatively, all rendering devices on a home network might be updated via unicast (sequentially) or multicast (simultaneously). Merely associating the mobile device with the renderer may begin the caching process with or without opening a fling application on the mobile device. Encryption may be applied to the media stored in the cache, and the media stored in the cache may be provided with an expiration time period. Once the media reaches the expiration time period (e.g., date, stored length of time, time), the cache may automatically delete the media from the cache.

In another aspect, the fling application on the mobile device may determine to upgrade already cached items with higher quality versions if the higher quality versions are supported by the output device. For example, a cached media item may be downsampled to be stored at 480p resolution due to network conditions between the rendering device and the mobile device, and the original may be available in 4K resolution. If the output display device supports 4K resolution, the lower quality cached version may be later replaced with the 4K resolution version or any resolution in between (e.g., 720p, 1080p). Upgrading of cached media items may occur after the mobile device has cached a certain percentage of the media (e.g., 1%-50%) or a certain number of media items (e.g., top ten most frequently flung media items, most frequently flung folder).

The mobile device 322 may have a preview mode where the user is able to view media on the mobile device 322 before the media is flung. The media to be cached may depend on the current media item that the user is viewing or previewing. Each time the user changes media being previewed the media to be cached may be updated in response to the change. For example, the mobile device 322 may contain data indicating that when a first media item is flung, sent, or transferred to the rendering device, the next media item flung is frequently a second media item. Thus, the media item(s) to be cached may be dynamically determined based on the user's currently viewed or previewed item.

Flung media may be stored for a period of time in the cache so that if the user decides to re-fling recently flung media, the media may be pulled from the cache rather than being re-transmitted to the rendering device. For example, a user may flip through a series of pictures and may move backwards and forwards through the series. A first picture in the series may be flung followed by a second picture in the series. The user may then re-fling the first picture, and upon the re-flinging of the first picture, the rendering device may retrieve the first picture from the cache.

In some aspects, the rendering device may contain or have local access (e.g., network attached storage) to a large amount of storage (e.g., 3-6 terabytes) which can store the user's entire library of media (e.g., photos, videos, files). The mobile device 322 may cache the user's library of media using the storage available at the rendering device. The user may have security control over the cache of media including encryption and the ability to clear the cache.

After the mobile device or system has determined one or more media items to cache 420, the mobile device may process the media for caching at state 406. For example, the mobile device may generate a cache request including the media to cache and transmit the media to the rendering device. The cache request may have an indicator indicating that the included media content is to be cached. After processing for caching the media is completed 422, the mobile device may return to state 404 to determine media items to cache.

At any time during the media browsing or preview, the user can select media to fling, and the mobile device 322 will proceed to state 408 to process the fling request.

Figure 5:
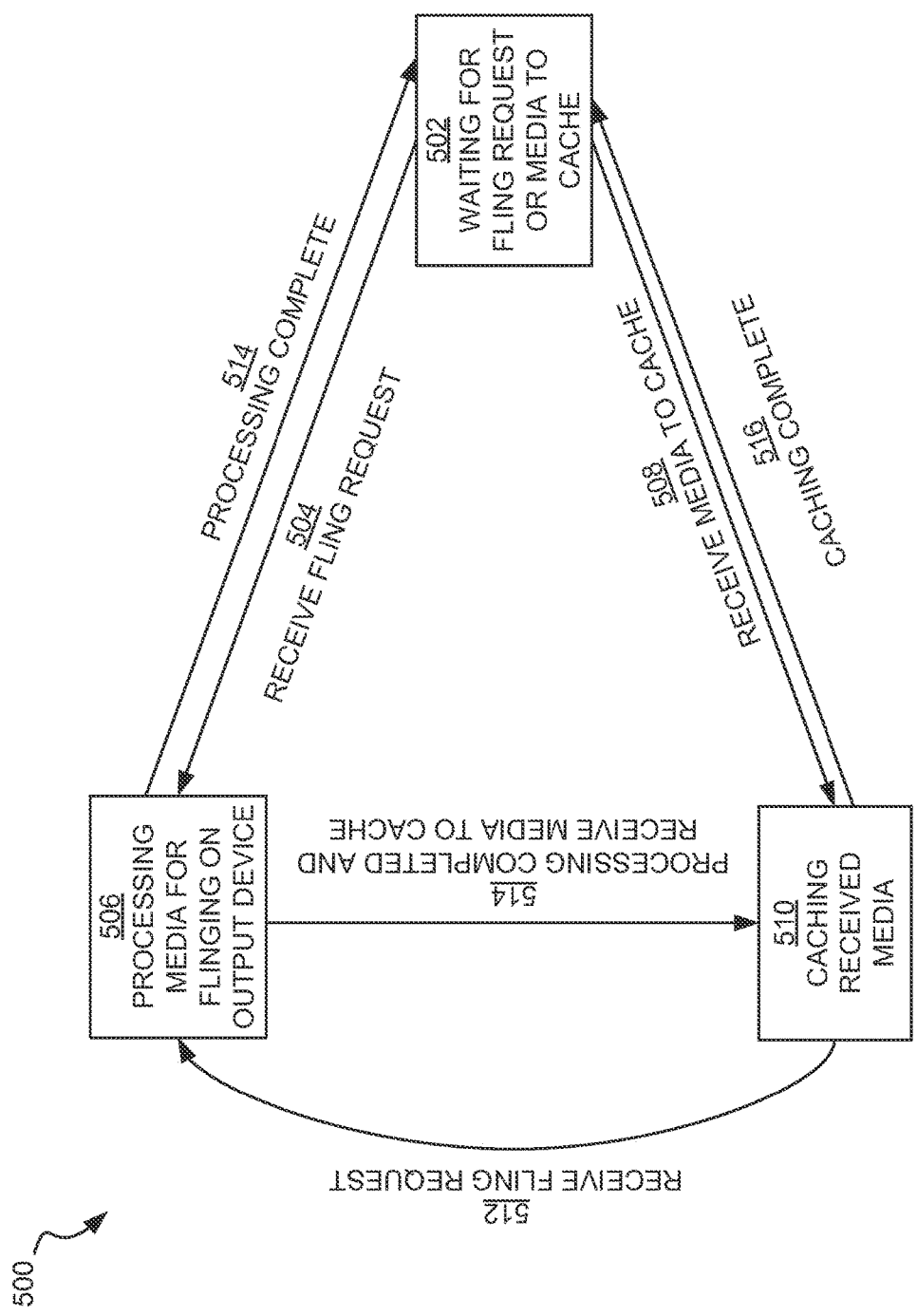
FIG. 5 illustrates an example state diagram of a rendering device according to various aspects of the disclosure.

FIG. 5 illustrates an example state diagram 500 of a system or a rendering device. In the absence of a fling request or reception of media for caching, the rendering device may be at state 502 waiting for a fling request or media for caching. At 504, the rendering device may receive a fling request from the electronic or mobile device 322. In response to receiving the fling request 504, the rendering device may begin processing media for outputting (e.g., displaying, presenting) on the output device at 506. Returning to 502, the rendering device may receive media to cache at 508. In response to receiving media to cache 508, the rendering device may begin caching the received media at step 510. While caching received media, the rendering device may receive a fling request at 512 and transition to processing media for flinging on the output device 506 in response to receiving the fling request 512. After the processing of the fling request is complete 514 or caching the received media is complete 516, the rendering device may return to state 502.

In some aspects, the cache may have limited memory and flung items may be buffered in the cache, and the rendering device may clear the cache in response to receiving a fling request in order to buffer the incoming media fling.

Figure 6:
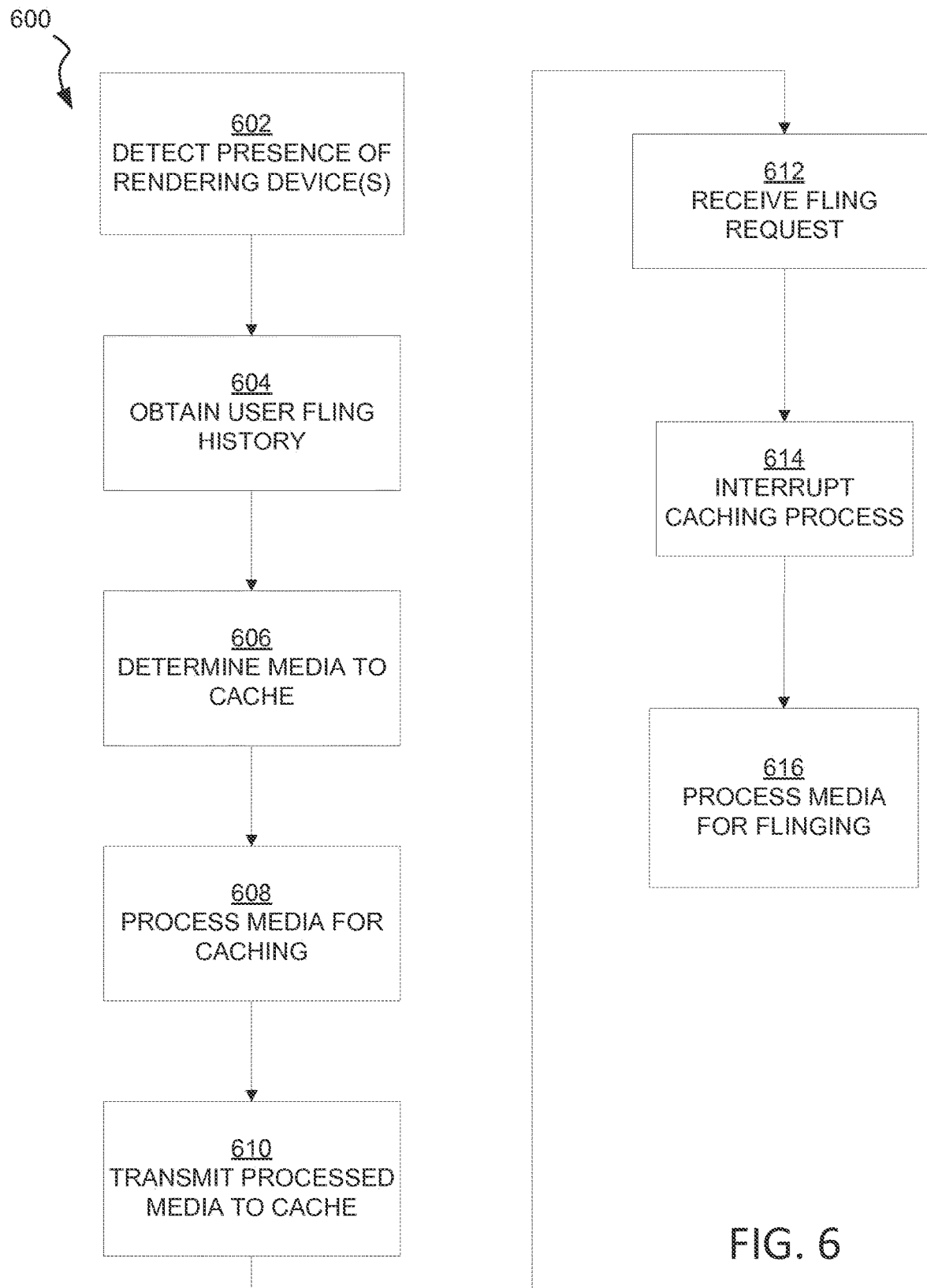
FIG. 6 illustrates an example method for a media fling system supporting caching of media according to various aspects of the disclosure.

FIG. 6 illustrates an example method 600 for a media fling system supporting caching of media. An electronic device 322 may be located at a user premises 316. At the user premises 316 and/or while connected to access node 318, the electronic device 322 may detect or determine the presence of rendering devices located at the user premises 316 and/or connected to access node 318. In some instances, the electronic device 322 may automatically select the most likely display device based on the location of the mobile device and past user fling behavior. Upon selecting the most likely display device, the mobile device may begin determining the first media item to cache which may be before the user selects the first item to fling. In other words, when the user initiates the fling application, the first most likely media item to be selected may be immediately transmitted to the display device from the media source even before any media has been actually selected by the user for flinging.

At step 604, the electronic device 322 may obtain and/or retrieve fling history of the user to be used in determining which media should be cached at the rendering device.

At step 606, the electronic device 322 may determine media to cache based on various factors including user fling history and current navigation position in the files. The cache may learn from past experience or user history and/or may prioritize caching based on a storage hierarchy and/or location based data. For example, the media files may be organized into multiple folders, and the user may be browsing through media files in one folder. In response to the user viewing a file in a particular folder, the fling application may identify the files in the particular folder for caching.

In another aspect, the fling application may have knowledge based on user fling history of the number of times a media item is flung and the resolution, format, and/or transcoding used for each fling. The user fling history may be based on a location. The fling application may prioritize caching of the media items in the order of decreasing fling count and automatically process the media item to match the most frequently used resolution, format, and/or transcoding for the user's location. Similarly, the fling application may track the number of times that a user flings media from each folder and the resolution, format, and/or transcoding used for each fling. For example, the electronic device may store statistics (e.g., fling counts, resolution information, transcoding information) related to the fling requests in the memory which may be used to determine media items to cache. Upon starting the fling application, the fling application may automatically begin caching the folder from which media is most frequently flung and continue with caching the contents of the next most frequently flung folder. In determining the media item to fling, the fling application may take into account popular items on a user's social media network (Twitter, Instagram, Facebook, Pinterest). Using Facebook as an example, popular social media items may be determined by the number of times an item is "Liked," shared, commented on, and/or viewed. In another example, popular social media items or viral media items may be determined based on the number of times other users in the user's social media network have flung the particular media item.

At step 608, the media is transformed or processed for caching and transmitted to the cache at the rendering device at step 610. At step 612, a user may select a media item to fling using the electronic device. The electronic device may interrupt the caching process to process the selected media item for flinging at step 614. At step 616, the selected media item may be transformed (e.g., processed) for flinging (e.g., sending or transferring) and transferred or flung as described in U.S. patent application Ser. No. 14/461,207 filed on Aug. 15, 2014, and entitled "MEDIA FLING SYSTEM" which is incorporated by reference in its entirety.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

The invention claimed is:
1. A method comprising:
   initiating sending, by a computing device to a rendering device, at least one content item for caching at a first resolution;
   determining, by the computing device, whether a portion of the at least one content item cached, by the rendering device at the first resolution, satisfies a threshold cor- responding to caching less than all of the at least one content item at the first resolution; and based on the determining that the threshold has been satisfied:

interrupting the sending of the at least one content item for caching at the first resolution; and initiating sending, for replacing the portion of the at least one content item that has been cached at the first resolution, the at least one content item for caching at a second resolution that is greater than the first resolution.

2. The method of claim 1, further comprising:

interrupting, based on a fling request indicating a second content item different from the at least one content item, the sending of the at least one content item at the first resolution;

initiating sending of the second content item to the rendering device; and based on a determination that the sending of the second content item to the rendering device is complete, resuming the sending of the at least one content item at the first resolution.

3. The method of claim 1, wherein the threshold is a threshold percentage of data corresponding to the at least one content item.

4. The method of claim 1, wherein:

the at least one content item comprises a plurality of content items, and the threshold is a threshold quantity of content items of the plurality of content items.

5. The method of claim 1, further comprising determining, based at least on a user history, the at least one content item for caching.

6. The method of claim 1, further comprising:

receiving a user request to view a selected content item; and determining, based on the user request, the at least one content item for caching.

7. The method of claim 1, further comprising:

storing the at least one content item in the computing device; and determining, based on a fling count for the at least one content item, the at least one content item for caching.

8. A system comprising:

a rendering device; and a computing device comprising:

one or more first processors; and memory storing first instructions that, when executed by the one or more first processors, cause the computing device to:

initiate sending, to the rendering device, at least one content item for caching at a first resolution;

determine whether a portion of the at least one content item cached, by the rendering device at the first resolution, satisfies a threshold corresponding to caching less than all of the at least one content item at the first resolution; and based on the determining that the threshold has been satisfied:

interrupt the sending of the at least one content item for caching at the first resolution; and initiate sending, for replacing the portion of the at least one content item that has been cached at the first resolution, the at least one content item for caching at a second resolution that is greater than the first resolution; and wherein the rendering device comprises:

one or more second processors; and memory storing second instructions that, when executed by the one or more second processors, cause the rendering device to cache the portion of the at least one content item.

9. The system of claim 8, wherein the first instructions, when executed by the one or more first processors, further cause the computing device to:

interrupt, based on a fling request indicating a second content item different from the at least one content item, the sending of the at least one content item at the first resolution;

initiate sending of the second content item to the rendering device; and based on a determination that the sending of the second content item to the rendering device is complete, resume the sending of the at least one content item at the first resolution.

10. The system of claim 8, wherein the threshold is a threshold percentage of data corresponding to the at least one content item.

11. The system of claim 8, wherein:

the at least one content item comprises a plurality of content items, and the threshold is a threshold quantity of content items of the plurality of content items.

12. The system of claim 8, wherein the first instructions, when executed by the one or more first processors, further cause the computing device to determine, based at least on a user history, the at least one content item for caching.

13. The system of claim 8, wherein the first instructions, when executed by the one or more first processors, further cause the computing device to:

receive a user request to view a selected content item; and determine, based on the user request, the at least one content item for caching.

14. The system of claim 8, wherein the first instructions, when executed by the one or more first processors, further cause the computing device to:

store the at least one content item in the computing device; and determine, based on a fling count for the at least one content item, the at least one content item for caching.

15. A non-transitory computer readable medium storing instructions that, when executed, cause:

initiating sending, by a computing device to a rendering device, at least one content item for caching at a first resolution;

determining, by the computing device, whether a portion of the at least one content item cached, by the rendering device at the first resolution, satisfies a threshold corresponding to caching less than all of the at least one content item at the first resolution; and based on the determining that the threshold has been satisfied:

interrupting the sending of the at least one content item for caching at the first resolution; and initiating sending, for replacing the portion of the at least one content item that has been cached at the first resolution, the at least one content item for caching at a second resolution that is greater than the first resolution.

16. The non-transitory computer readable medium of claim 15, wherein the instructions, when executed, further cause:
   interrupting, based on a fling request indicating a second content item different from the at least one content item, the sending of the at least one content item at the first resolution;
   initiating sending of the second content item to the rendering device; and
   based on a determination that the sending of the second content item to the rendering device is complete, resuming the sending of the at least one content item at the first resolution.

17. The non-transitory computer readable medium of claim 15, wherein the threshold is a threshold percentage of data corresponding to the at least one content item.

18. The non-transitory computer readable medium of claim 15, wherein:
   the at least one content item comprises a plurality of content items, and
   the threshold is a threshold quantity of content items of the plurality of content items.

19. The non-transitory computer readable medium of claim 15, wherein the instructions, when executed, further cause determining, based at least on a user history, the at least one content item for caching.

20. The non-transitory computer readable medium of claim 15, wherein the instructions, when executed, further cause:
   receiving a user request to view a selected content item; and
   determining, based on the user request, the at least one content item for caching.

* * * * *